(No Model.)
F. HÖNIG.
HOSE COUPLING.
No. 537,825. Patented Apr. 23, 1895.
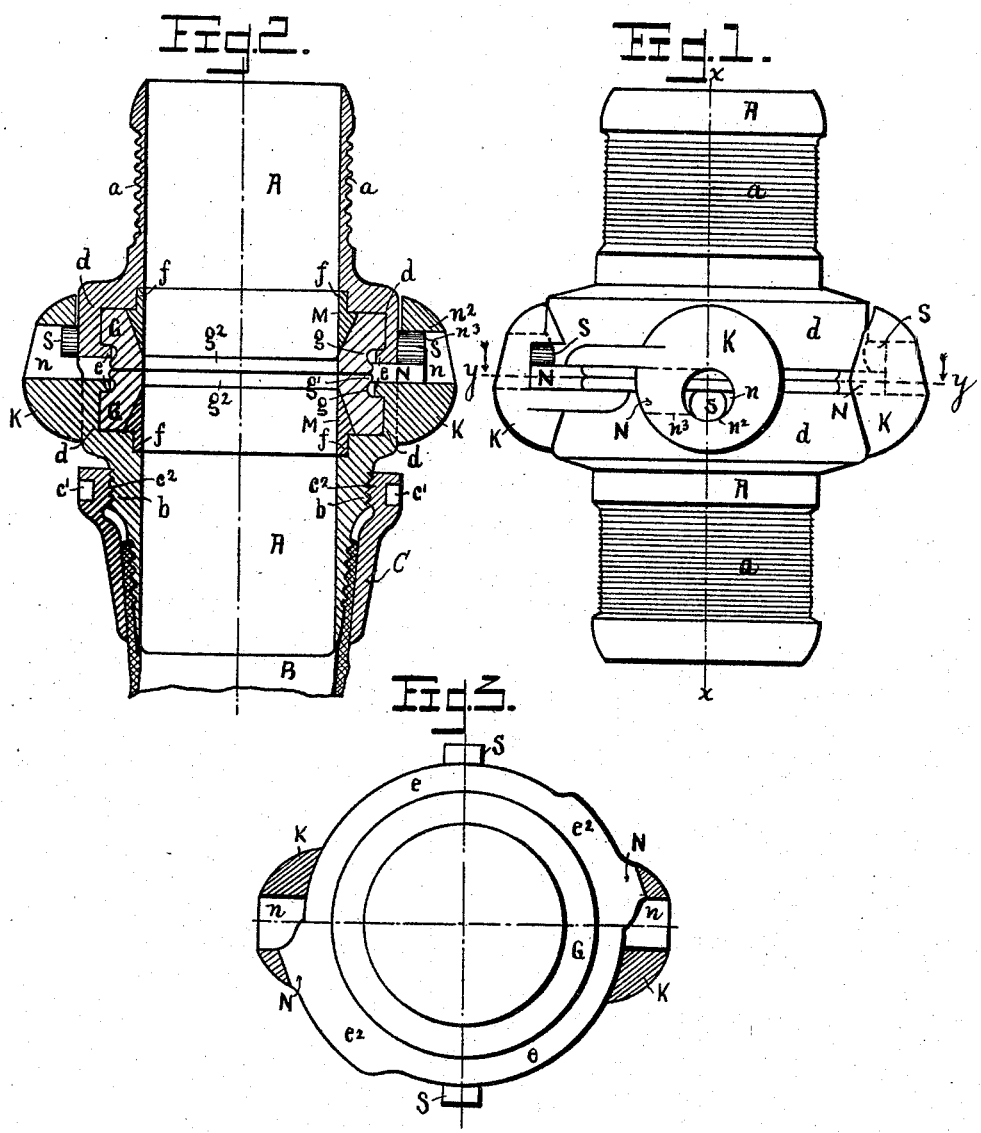
WITNESSES:
Charles Schafer.
Emma Stech.
INVENTOR
Fritz Hönig.
BY Reichelt + Oltsch.
ATTORNEY'S.

UNITED STATES PATENT OFFICE.

FRITZ HÖNIG, OF COLOGNE, GERMANY.

HOSE-COUPLING.

SPECIFICATION forming part of Letters Patent No. 537,825, dated April 23, 1895.

Application filed July 10, 1894. Serial No. 517,129. (No model.) Patented in Germany February 29, 1893, No. 21,983; in England December 23, 1893, No. 24,773; in Belgium March 14, 1894, No. 83,032, and in Austria April 21, 1894, No. 44 and No. 1,145.

*To all whom it may concern:*

Be it known that I, FRITZ HÖNIG, a subject of the King of Prussia, German Emperor, and a resident of Cologne, Germany, have invented certain new and useful Improvements in Hose-Couplings, (for which I have obtained a patent in Germany, dated February 29, 1893, No. 21,983; in Great Britain, dated December 23, 1893, No. 24,773; in Belgium, dated March 14, 1894, No. 83,032, and in Austria, register No. 44 and No. 1,145, dated April 21, 1894,) of which the following is a specification.

The objects of my invention are to provide a simple and effective device which may be quickly operated to couple hose sections together or to couple the hose to water supply plugs and for other purposes which require immediate and secure connection, to provide a coupling which will tend to pack the coupling joint more closely when the internal pressure comes upon it or becomes greater and which will not become disconnected by any ordinary strains to which it is subjected, and to provide simple and secure means for holding the packing in place and for permitting its removal, replacement, or renewal when desired.

The improvement consists generally stated in two sections, each of which is provided with a pin or pins and with a knob or knobs of novel construction to interlock one with the opposite members of the other respectively, and the invention also consists in providing each section of a hose coupling with a packing ring and follower ring of novel construction which latter will securely hold the packing ring in place and also serve to hold and compress the opposing packing rings more closely together when forced outwardly by the internal pressure of the gas, air, or water upon it and to thus pack the joint more closely as the pressure becomes greater.

In the accompanying drawings:—Figure 1 is a side elevation of my improved coupling showing both sections joined together or interlocked; Fig. 2, a longitudinal section in line $x$—$x$ of Fig. 1, and Fig. 3 a transverse section in line $y$—$y$ of Fig. 1, through one of the coupling sections looking from left to right as indicated by arrows.

The hose coupling comprises two sections of like construction and connections, each section and corresponding part being designated by the same letter.

A cylindrical shell A having circumferential grooved sections $a$, over which is fitted the end of a hose section B held securely thereon by a correspondingly coned inner surface of a thimble C and having wrench sockets $c'$, and an internal screw threaded end $c^2$, which is fitted upon a correspondingly threaded shoulder $b$, of the cylindrical shell A and by means of a pin wrench or spanner of well known construction (not shown) fitted into the sockets $c'$, may be screwed with sufficient force to securely hold the end of the hose section upon the coupling section.

The coupling section A is enlarged at its interlocking end to provide a socket $d$, to receive a packing ring G, which is held in place partly by an inwardly projecting flange $e$, at its rim, and also by a follower ring M which is fitted to an inner seat or socket $f$, connecting the inner end or face of the socket $d$, with the internal unbroken surface of the hose and coupling sections, the packing ring, follower ring, and coupling section sockets being hereinafter more particularly described both as to their construction and operation.

The coupling sections have each two pins S located diametrically opposite each other and projecting from the peripheral margin of the flange $e$, of the coupling socket $d$, and the rounded pins S faced off to present a flat surface coincident with the face of the flange $e$, thus allowing the pins S upon the opposite coupling sections to be closely pressed together without interlocking with each other.

The coupling sections have each two knobs located upon and secured to the sockets $d$, to receive the pins of the opposing coupling section and in diametric lines at right angles to that of the pins opposite the opposing sections. The knobs K have recessed sockets $n$, communicating with passages N cut laterally or in the same plane with the face of the coupling section through the knobs K, one of the side walls of said passages being a continuation of the enlarged portion $e^2$, of flange $e$, the said enlarged portion $e^2$, of the flange forming a guide abutment to receive the pressure of the pins S, as they are turned upon the longitudinal axis of the coupling and wabbled or pressed from side to side in the movement required to engage the pins S with the recessed sockets $n$, of the knob K. The side $n^2$, of the recessed sockets $n$, of the knob K opposite the side $e^2$, is depressed to extend beyond the wall $n^3$, of the passage N, which leads to said recessed socket (as shown in Figs. 1 and 2) and thus engages with the rounded portion or belly of the pin S, which is held securely when placed therein by the pressure of the packing rings G one against the other. Four interlocking points are thus secured, when two pins and two knobs are placed upon each coupling section and an accidental disconnection thus becomes practically impossible.

The packing rings G and followers M are peculiarly shaped to effect a more perfect closure and provide for increased expansive and contractive movement, which latter is met by an outward correlative pressure upon the inside of the packing. This is accomplished by making the inner surface of the packing rings G with an expanding or rearwardly dished surface which fits snugly upon the oppositely coned outer surface of a follower ring M, and providing a circumferential groove $g$, upon the packing G which thus provides a lip $g'$, of extended bearing surface which will press up between the flanges $e$, of the coupling shells, the said flanges entering the groove $g$, and the full bulk of said packing being thus sufficiently yielding to provide a water tight, steam tight or air tight joint of sufficient flexibility to admit of the full pressure required to couple the sections, being applied by hand or by means of a spanner ordinarily employed for such purpose; an eighth of a turn only being required to turn and interlock one section upon the other. Both sections being alike the parts are all interchangeable.

The packing ring G is readily placed within or removed from the socket of the coupling section when the follower M is not in position; it being necessary to first remove the follower before the packing can be removed, which is easily accomplished by pulling outwardly upon the follower, thus forcing its inclined outer surface against the correspondingly inclined inner surface of the packing ring, and forcing the lips $g'$, of the packing out until the groove $g$, is crowded close around the flange $e$, of the coupling, and the shoulder $m$, of the follower passes the outer face of the packing ring. The follower is replaced by reversing the operation just described as will be readily understood.

The packing ring G projects outwardly from the follower M a short distance, and an exposed inner uncovered ledge or peripheral edge $g^2$, thus provided to receive the direct pressure of the air, gas or water from within the pipe, which thus also tends to press the packing outwardly with increasing compressive tendency as hereinbefore described, and thus insure increased power of resistance to the escape of the contents of the pipe through the said joint.

The applicability of this device to numerous purposes requiring safe, secure and immediate action in coupling hose pipes, is evident and no coupling is better adapted for air brake or fire hose pipe connection.

I claim as my invention and desire to secure by Letters Patent—

1. A hose coupling, section shell comprising an enlarged portion, a socket, a packing ring to fit the socket having an inwardly expanding conical surface and a corresponding outwardly coned follower ring to hold the packing in place, and cause its outward expansion, substantially as described.

2. A hose coupling, section comprising a shell having an enlarged socket, a packing ring having a tapering inner surface fitted within the socket, an inner seat $f$, in the shell and a follower ring M having a conical outer surface to receive the packing ring, and an inner diameter coincident with that of the adjacent portion of the shell and the outer edge of the packing ring, substantially as described.

3. A hose coupling, section comprising a shell A, having enlargement $d$, flange $e$, and inner seat $f$, a packing ring having a lip $g'$, and circumferential groove $g$, to receive the flange $e$, an inwardly expanding inner surface and a plane projecting rim $g^2$, and a follower ring M to fit the seat $f$, and tapering outwardly to fit the tapering portion of the packing ring, substantially as described.

4. A hose coupling, the combination with two interlocking shells, each having diametrically opposite pins and correspondingly diametrically opposite knobs recessed to receive the said pins, of an enlarged portion in each section having a socket, and a packing ring having an inwardly expanding conical surface fitting in said socket and a corresponding outwardly coned follower ring to hold the packing in place, substantially as described.

In testimony that I claim the foregoing as my invention I have signed my name in presence of two subscribing witnesses.

FRITZ HÖNIG.

Witnesses:
FRITZ SCHRÖDER,
SOPHIE NAGEL.